J. McCORMICK.
HARNESS SADDLE-TREE.
No. 189,946. Patented April 24, 1877.
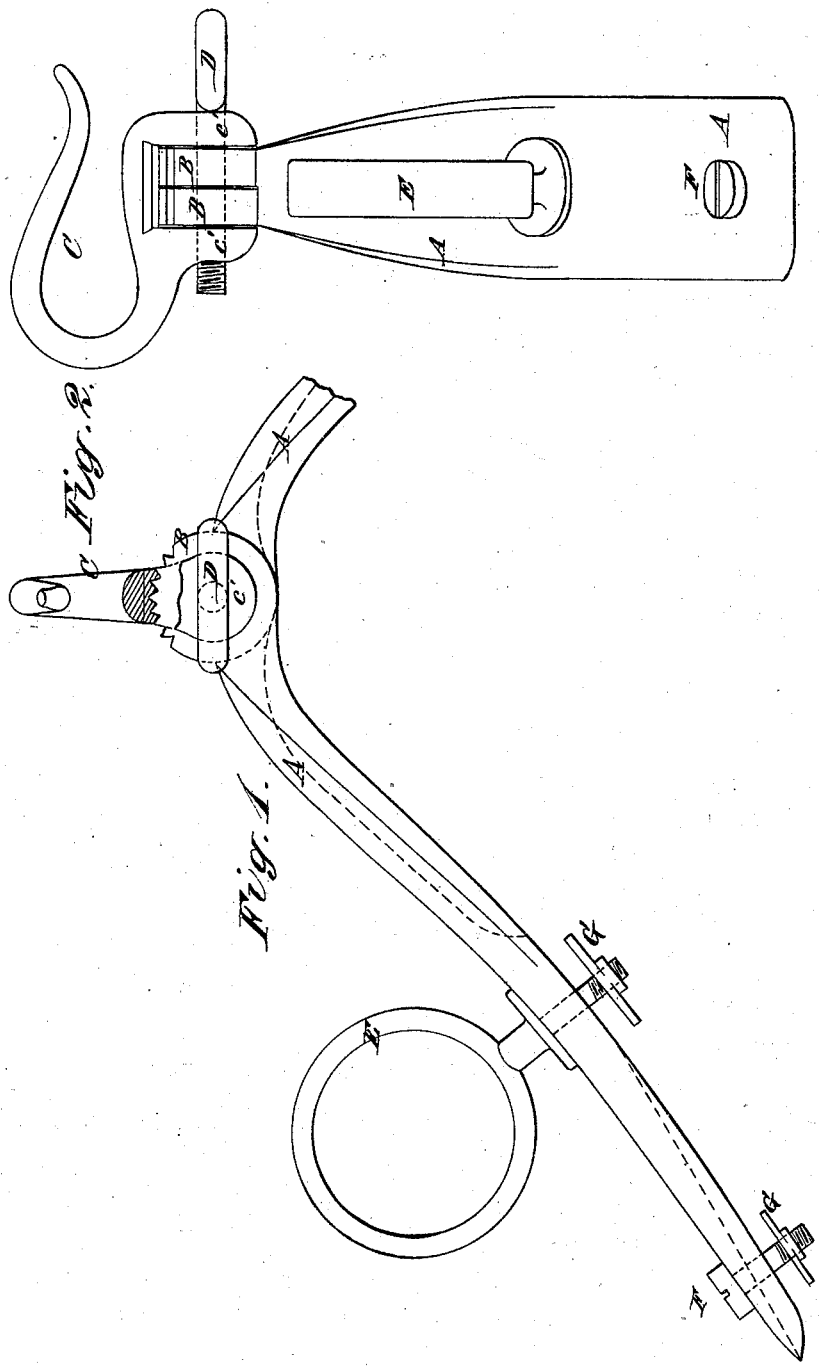

UNITED STATES PATENT OFFICE.

JAMES McCORMICK, OF GLIDDEN, IOWA.

IMPROVEMENT IN HARNESS-SADDLE TREES.

Specification forming part of Letters Patent No. 189,946, dated April 24, 1877; application filed March 19, 1877.

*To all whom it may concern:*

Be it known that I, JAMES MCCORMICK, of Glidden, in the county of Carroll and State of Iowa, have invented a new and useful Improvement in Adjustable Saddle-Tree for Harness, of which the following is a specification:

Figure 1 is a rear view of a part of my improved saddle-tree, partly in section, to show the construction. Fig. 2 is a side view of the same.

Similar letters of reference indicate corresponding parts.

The object of this invention is to furnish an improved saddle-tree, which shall be so constructed that it may be adjusted to fit the horse's back, and thus prevent his back from being galled by an ill-fitting saddle, and which shall be simple in construction, convenient in use, strong, and durable.

The invention consists in a saddle-tree made in two parts having lugs formed upon their upper ends, halved to each other, and provided with teeth to mesh into teeth formed upon the under side of the base of the water-hook, and in the screw provided with a loop upon its rear end in combination with the lugs formed upon the ends of the base of the water-hook, and with the lugs of the parts of the saddle-tree, as hereinafter fully described.

A are the side parts or wings of the saddle, which are made separate from each other and upon the upper ends of which are formed circular lugs B, which are halved to each other vertically, as shown in Fig. 2. Upon the upper edges of the lugs B are formed teeth to mesh into corresponding teeth formed upon the under side of the base of the water-hook C.

By this construction the parts A of the tree will be held securely in place when adjusted to the horse's back.

Upon the front and rear ends of the base of the water-hook C are formed lugs $c'$, which project downward upon the front and rear sides of the lugs B, as shown in Figs. 1 and 2. The lugs B $c'$ are perforated to receive the screw D, by which the said parts are firmly locked together.

Upon the rear end of the screw D is formed a loop to receive the back-strap, and which also serves as a handle for screwing the said screw in and out.

The parts A of the tree are provided with terrets E and screws F, which are screwed into nuts G secured to the skirt of the saddle before the pad is sewed on.

Having thus described my invention, I claim as new and desire to secure by Letters Patent—

1. A saddle-tree, made in two parts, A, having lugs B formed upon their upper ends, halved to each other, and provided with teeth to mesh into teeth formed upon the under side of the base of the water-hook C, substantially as herein shown and described.

2. The screw D, provided with a loop upon its rear end, in combination with the lugs $c'$ formed upon the ends of the base of the water-hook C and with the lugs B of the parts A of the saddle-tree, substantially as herein shown and described.

JAMES McCORMICK.

Witnesses:
   M. W. BEACH,
   C. I. HINMAN.